T. J. MULLEN & T. F. & M. J. BRENNAN.
BRAKE.
APPLICATION FILED MAY 21, 1908.

904,711.

Patented Nov. 24, 1908.
6 SHEETS—SHEET 1.

T. J. MULLEN & T. F. & M. J. BRENNAN.
BRAKE.
APPLICATION FILED MAY 21, 1908.

904,711.

Patented Nov. 24, 1908.
6 SHEETS—SHEET 2.

Inventor,
Thomas J. Mullen
Thomas F. Brennan
Michael J. Brennan
By Mason Fenwick & Lawrence
their Attorneys Witnesses
J. M. Fowler Jr.
A. S. Kitchin

T. J. MULLEN & T. F. & M. J. BRENNAN.
BRAKE.
APPLICATION FILED MAY 21, 1908.

904,711.

Patented Nov. 24, 1908.
6 SHEETS—SHEET 6.

Witnesses
J. M. Fowler Jr.
A. S. Kitchin.

Inventors
Thomas J. Mullen
Thomas F. Brennan
Michael J. Brennan
By Mason Fenwick Lawrence
their Attorneys

UNITED STATES PATENT OFFICE.

THOMAS J. MULLEN, THOMAS F. BRENNAN, AND MICHAEL J. BRENNAN, OF NEW YORK, N. Y.

BRAKE.

No. 904,711.  Specification of Letters Patent.  Patented Nov. 24, 1908.

Application filed May 21, 1908. Serial No. 434,205.

*To all whom it may concern:*

Be it known that we, THOMAS J. MULLEN, THOMAS F. BRENNAN, and MICHAEL J. BRENNAN, citizens of the United States, residing at New York, in the county of New York and State of New York, have invented certain new and useful Improvements in Brakes; and we do hereby declare the following to be a full, clear, and exact description of the invention, such as will enable others skilled in the art to which it appertains to make and use the same.

This invention relates to improvements in braking apparatus for vehicles, and particularly for cars of various kinds, and has for an object the provision of a brake comprising a braking wheel and means for gripping or bringing into frictional contact therewith a brake shoe.

Another object in view is the provision of a braking mechanism comprising a brake wheel, a brake shoe adapted to engage the wheel, means for pivotally supporting the brake shoe, and means for giving a direct pull upon the shoe for bringing the same into frictional contact with the brake wheel.

A further object of the invention is the provision of a braking mechanism arranged to brake all the wheels of a truck and to give an even pressure to the braking mechanism for each set of wheels and to give a direct pull upon the braking mechanism for utilizing substantially all of the power at the point desired.

A still further object of the invention is the provision of a braking mechanism having a braking shoe and a direct pull therefor in combination with a rock shaft and connecting mechanism, whereby motion may be transmitted from said rock shaft to said brake shoe.

With these and other objects in view the invention comprises certain novel constructions, combinations and arrangement of parts as will be hereinafter more fully described and claimed.

In the accompanying drawing.

Figure 1:
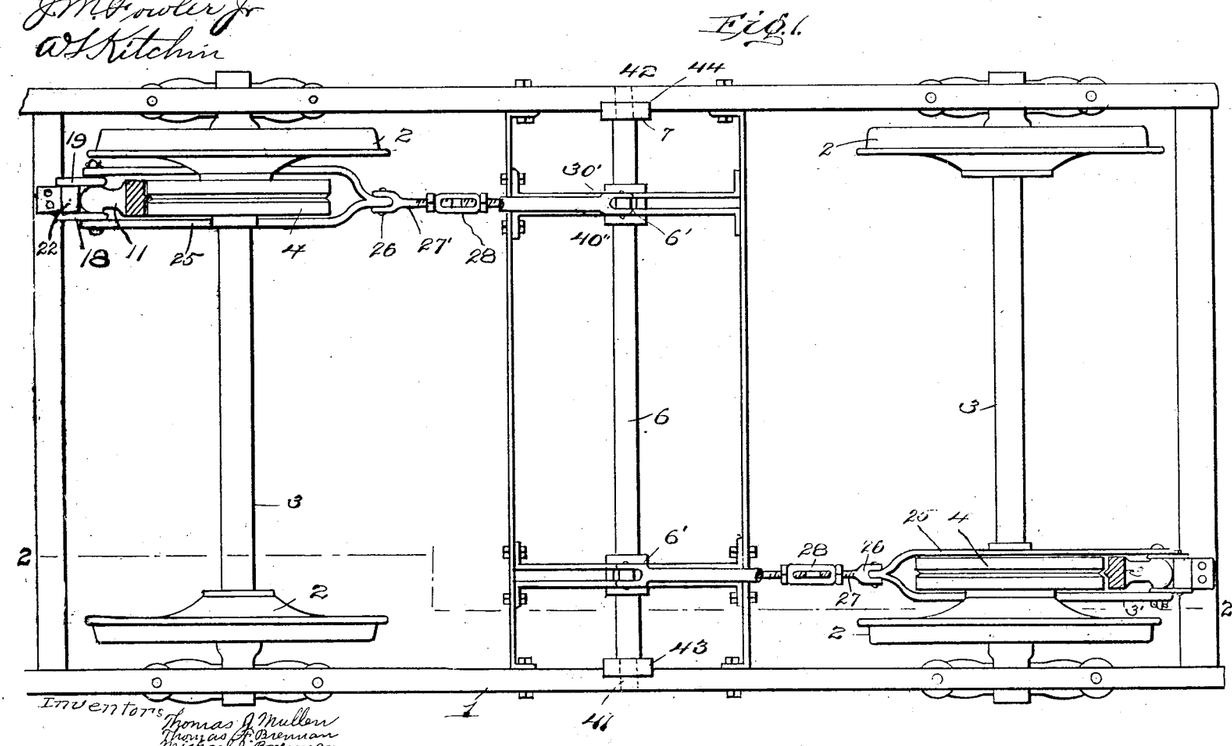
Figure 1 is a top plan view of a car truck with braking mechanism formed according to the present invention applied thereto.
Figure 2:
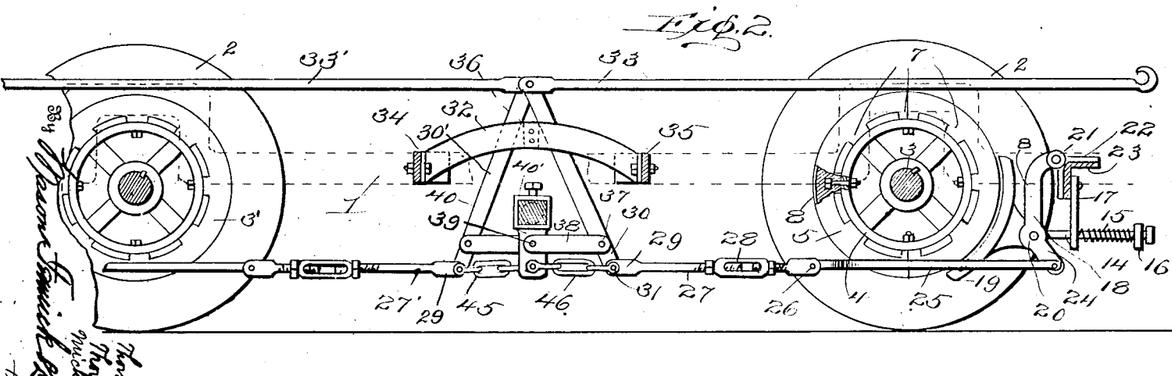
Fig. 2 is a section through Fig. 1 approximately on line 2—2.
Figure 3:
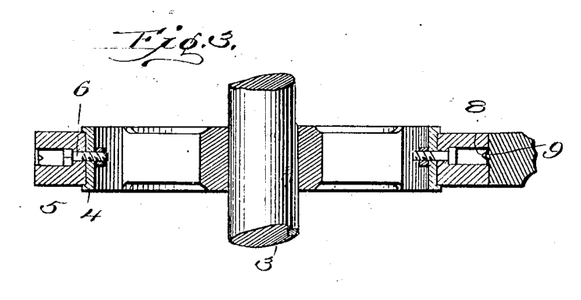
Fig. 3 is a section approximately on line 3—3 of Fig. 2.

Referring to the drawing by numerals, 1 indicates a framework or truck of any desired or preferred construction, and 2 the wheels of the truck. An axle 3 for each pair of wheels is provided in the usual manner and is of any usual or preferred construction. Secured to one of the axles 3 (Fig. 2) is a brake wheel 4 provided with an outer friction rim 5. The friction rim 5 may be made from cast iron or other material as may be desired and is secured in position by bolts 6 as clearly seen in Figs. 2 and 3. The friction member or rim 5 is provided with a plurality of lugs or extensions 7 for spacing the rim from wheel 4, so that any heat created in friction rim 5 will not be easily communicated to wheel 4. Securing bolts 6 are adapted to pass through some of the projections 7 as clearly seen in Fig. 2. Wheel 4 is rigidly secured to axle 3 by any desired means as, for instance, by a key so that any power brought to bear upon friction rim 5, and consequently upon wheel 4, will be communicated to axle 3, and from there to wheels 2 of the truck.

Figure 5:
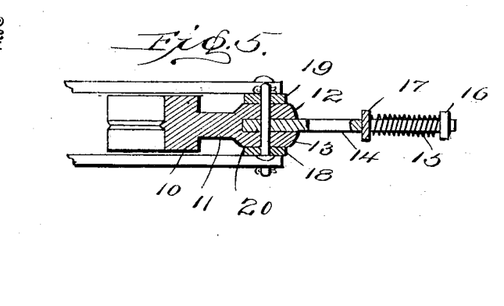
Fig. 5 is a section through Fig. 4 approximately on line 5—5.

Friction rim 5 is formed with a groove 8 which is adapted to be engaged by a projection 9 of brake shoe 10. The projection 9 is adapted, by its engagement with groove 8, to prevent any side playing or motion to brake shoe 10 as the same engages the rim 5. In use rim 5 and wheel 4 form a complete structure or brake wheel and the term brake wheel will be hereafter used to mean this entire structure. The brake shoe 10 is arranged with a lug or fin 11 extending to the rearward and formed with bosses 12 and 13. The fin 11 between the bosses 12 and 13 is bifurcated for receiving a rod or bar 14 which in turn receives a spring 15. Spring 15 is adapted to engage a stop 16 that is adjustably secured to bar 14 as, for instance, by threads, and by reason of the contact of spring 15 with stop 16 and a brace 17 a continuous tendency is given to brake shoe 10 to remain out of engagement with the brake wheel. A pair of supports 18 and 19 are adapted to hold brake shoe 10 in a correct position for engaging the brake wheel, a bearing pin or shaft 20 passing through the respective members 18 and 19, the fin 11, and also bar 14, as clearly seen in Fig. 5. The supporting members 18 and 19 extend upward from pin 20 and are pivotally mounted at 21 to a support or bracket 22 that is rigidly secured to one of the cross pieces 23 of frame 1. The supports 18 and 19 also extend downward at 24 and are held spaced apart by a suitable sleeve. The extensions 24 are adapted to be engaged by bifurcated rod or member 25 that has its branches pass on each side of the brake wheel for engaging the respective portion 24 of members 18 and 19. Rod 25 is pivotally secured at 26 to a rod 27 that has a turn buckle 28 interposed therein for affording adjustment for the rod. Rod 27 is bifurcated at 29 for receiving a lever 30 that is pivotally mounted at 31 therein. The lever 30 extends upward and passes between guides 32 and is engaged by a rod 33 that extends to any desired place to be operated by any desired mechanism for applying the brake, the mechanism for applying the brake being, for instance, a hand crank or the plunger of an air cylinder so that the brakes can be tightened or loosened in the ordinary or usual manner. The guides 32 are secured to cross bars 34 and 35 of the truck, and are provided with a centrally positioned block 36 for limiting the movement of lever 30 when the same is in a released position.

Pivotally mounted at 37 to lever 30 is a link 38 (Fig. 2) that in turn is pivotally mounted at 39 to a crank or lever 40, the crank or lever 40 being rigidly secured to a cross bar 40' which is pivotally mounted at 41 and 42 in brackets 43 and 44 respectively. This bar 40' and its cranks or levers 40 form an equalizing mechanism for equalizing the pressure brought to bear upon the brakes of the truck.

The brake wheel and connected mechanism have been described and lettered in relation to wheel 3, and surrounding parts, but it is to be understood that wheel 3' at the opposite end and surrounding parts are exactly like wheel 3 and surrounding parts, except that the same is positioned at the opposite end of the truck, and will therefore need no additional description. The lever 30' which is similar to lever 30, except that it operates in the opposite direction is adapted to be moved by a rod 33' by any desired brake operating mechanism, rod 33 being adapted to operate the brake mechanism from one end of the truck or car, as the case may be, and rod 33' being adapted to operate the brakes from the opposite direction.

Rod 27' which is similar to rod 27 is connected with the depending portion of a crank member 40'' by means of a chain 45 and crank or lever member 40 is connected to rod 27 by means of chain 46. By this construction and arrangement and use of chains 45 and 46 a direct chain pull is given to the various brakes, when lever 30 is moving to apply the brakes, chain 45 pulling for applying the brakes at the opposite end of the truck, and when lever 30' is moving for operating the brakes, chain 46 pulling upon rod 27 for applying the brakes at that end of the car. By this construction and arrangement any power brought to bear upon lever 30 will be equally divided between the brake shoes at each end of the truck for equally applying the shoes to their respective brake wheels, one of the levers giving a direct pull upon the brake shoe and one of the chains giving a direct pull upon the opposite brake shoe, whereby substantially all of the power used will be conveyed directly to the brake shoe.

Figure 6:
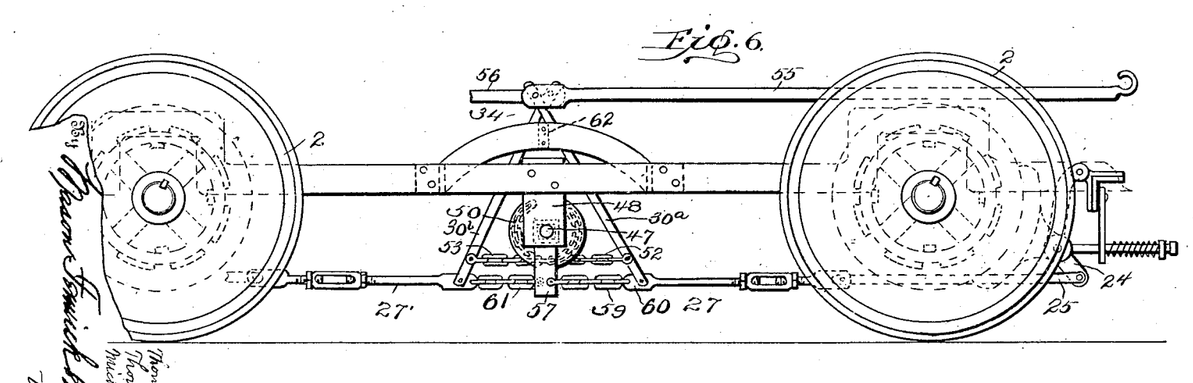
Fig. 6 is a side elevation of a slightly modified form of equalizing bar shown in connection with the preferred form of braking mechanism.
Figure 7:
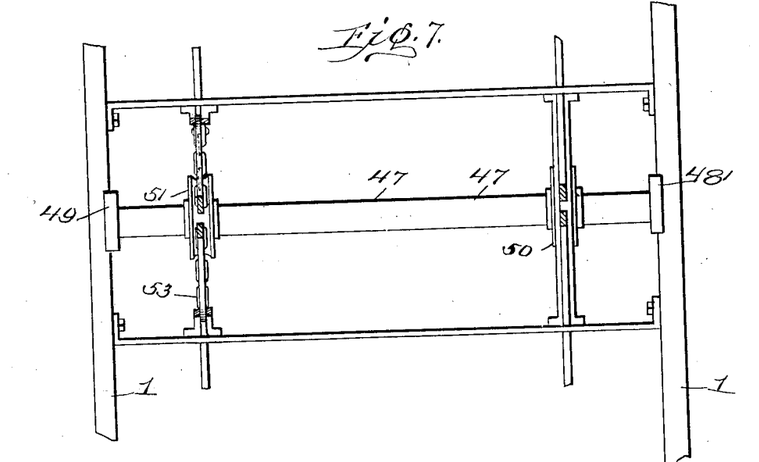
Fig. 7 is a fragmentary top plan view of slightly modified form of equalizing mechanism.
Figure 9:
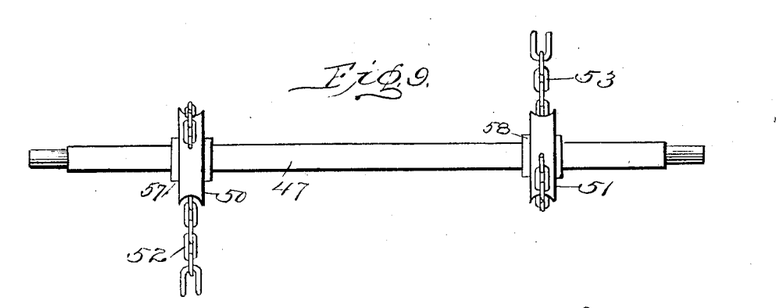
Fig. 9 is a plan view of the equalizing bar and chain shown in Fig. 7.

In Figs. 6, 7 and 9 a slightly modified form of equalizing bar is shown used with the preferred form of brake wheel and surrounding mechanism. Referring more particularly to these views, 47 is a cross bar pivotally mounted in brackets 48 and 49, and has rigidly secured thereto pulleys or grooved wheels 50 and 51. The shaft 47 is preferably constructed square, and the pulleys 50 and 51 made to conform thereto so as to positively insure against any slipping of the pulleys. In addition the pulleys are also secured in place by suitable set screws so as to prevent any longitudinal movement of the same upon the bar 47. Connected with the pulleys 50 and 51 are chains 52 and 53 which are also in turn connected to levers 30ª and 30ᵇ respectively, as clearly seen in Fig. 6. A rod 55 is provided which is adapted to act similarly to rod 33 for moving lever 30ª. A lever 30ᵇ similar to 30ª but on the opposite side of shaft 47 and adapted to operate in the opposite direction is connected with shaft 47 by means or chain 53 and grooved wheel 51. Connected to the upper end of lever 30ᵇ is a rod 56 that is adapted to move lever 30ᵇ in a similar manner to the way rod 55 moves lever 30ª, the rod 56 being operated from the opposite end of the car to rod 55. Bifurcated levers 57 and 58 are positioned upon bar 47. Lever 57 is adapted to have secured thereto a chain 59 which in turn is secured to rod 27 at 60 in order to communicate power from shaft 47 to rod 27 when lever 30ᵇ is being operated. A chain 61 is secured to lever 58 and to rod 27' so that whenever lever 38 is being operated power will be communicated therefrom through shaft 47 to rod 27'. These chains 59 and 61 relieve the stop or block 62, because if these chains were not arranged as set forth any strain brought upon chain 52 by reason of the movement of lever 40ᵇ would cause lever 30ª to be forced tightly against block 62. By this construction and arrangement of pulleys, rock shaft, and chains, a direct chain pull is given to the brakes, and also a structure is presented which may be operated from either end of the car for giving such direct pull upon the brake shoes.

Figure 8:
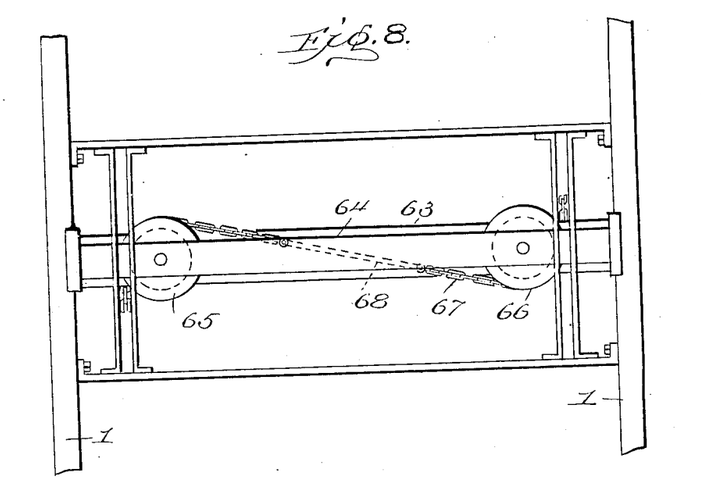
Fig. 8 is a fragmentary top plan view of a truck showing an equalizing mechanism embodying a slightly modified construction to that shown in Fig. 7, certain parts being removed for the purpose of illustration.
Figure 10:
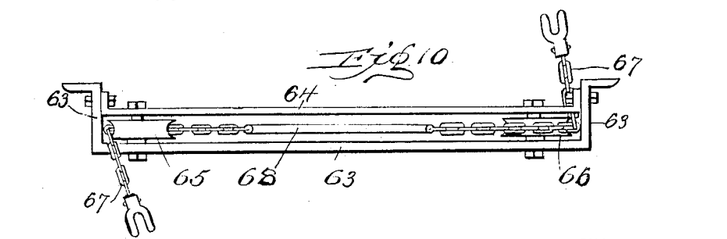
Fig. 10 is an edge view of the modified equalizing mechanism shown in Fig. 8.
Figure 12:
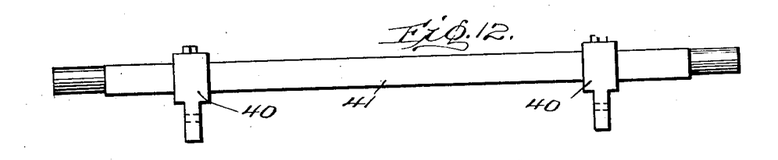
Fig. 12 is a side elevation of the rocker shaft and depending lever member of the preferred form.
Figure 13:
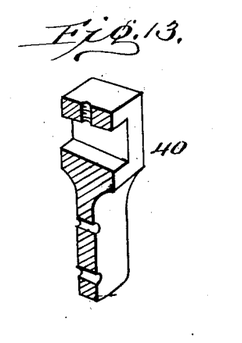
Fig. 13 is an enlarged sectional perspective view of the depending lever shown in Fig. 12.
Figure 14:
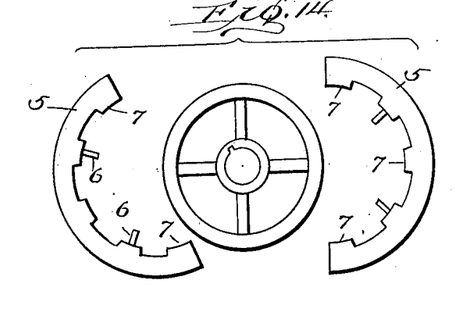
Fig. 14 is a side elevation of a brake wheel and friction bands, the friction bands being shown slightly separate from the wheel for the purpose of illustration.

In Figs. 8 and 10 is presented a further modified construction of equalizing mechanism that is adapted to be used with the preferred construction of brake wheel and surrounding mechanism. Referring more particularly to these figures, 63 indicates a bracket that is secured to the frame of the truck in any desired manner. Bracket 63 has a bracing bar 64 secured thereto as clearly seen in Fig. 10. A pair of pulleys 65 and 66 are horizontally mounted between brackets 63 and braces 64 over which a chain 67 is passed. Interposed intermediate the ends of chain 67 is a bar 68. This will necessitate the use of only a short piece of chain for passing around the respective pulleys 65 and 66. One end of the chain is adapted to engage a lever as 30 of the preferred construction, and the other lever 30'. This construction of chains connecting rod 68 and surrounding parts is adapted to be used with the levers 30 and 30' of the preferred construction, together with all of the remaining mechanism, except the rocker bar and links 38, and depending lever 40. When using the construction shown in Figs. 8 and 10 one of the levers, as 30, is moved by a rod, as 33, for moving rod 27. This will pull upon chain 67 which will move for a short distance around pulleys 65 and 66, and consequently convey motion from lever 30 to lever 30' which in turn will convey motion to rod 27'. When lever 30' is moved the motion of chain 67 will be reversed in order that power may be applied to rod 27 for applying the brake.

Figures 4, 11:
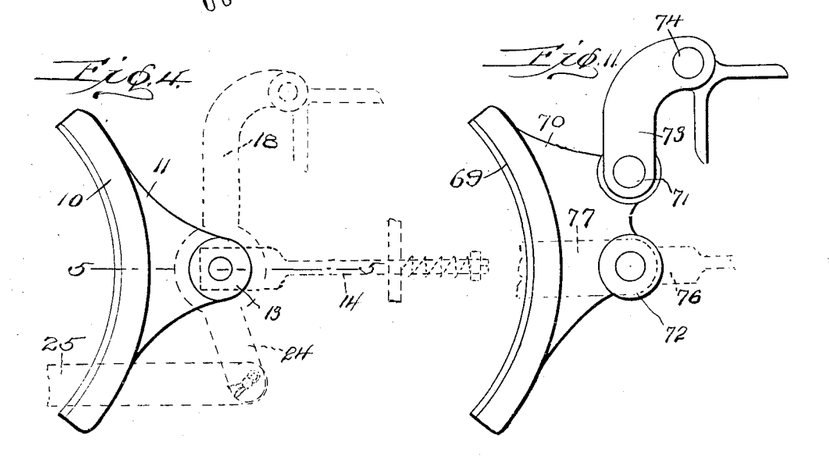
Fig. 4 is a side view of a brake shoe formed according to the present invention, certain surrounding parts being shown in dotted lines.
Fig. 11 is a side elevation of a slightly modified form of brake shoe and hanger therefor.

Fig. 11 discloses a brake shoe 69 having a fin 70 arranged with two lugs or journal portions 71 and 72. Pivotally mounted in journal member 71 is a hanger 73 that is pivotally mounted at 74 to a bracket 75 similar to bracket 22. Member 72 is bifurcated and is adapted to receive a bar 76 similar to bar 14, and also the bifurcated ends of bar 77 which is similar to bar 25. By this construction and arrangement extension 24 of the preferred structure may be dispensed with and yet sufficient leverage provided for causing the brake 35 to impinge against the brake wheel to properly operate with an ordinary amount of power. This structure also discloses a shoe which is pivotally mounted upon a pivotally mounted support, and has a double pivotal movement as the same approaches the wheel.

By the construction and arrangement of a brake wheel rigidly secured to the axle any desired size of brake wheel may be used, and also any desired sized brake shoe, so that great braking power may be exerted upon the traction wheels. It will be observed also that the various parts of the brake mechanism are strongly made, and comparatively few in number, so that the same is adapted to operate successfully without easily getting out of order. The use of a brake of this kind also prevents unnecessary wear upon the periphery of the traction wheels of the vehicle, since the braking system does not engage the traction wheels in any way. The braking mechanism may be applied to any desired kind of vehicles in common use, and to the trucks of street or railway cars as may be desired. It will also be observed that the rim 5 of a brake wheel is made into two parts so as to be easily applied and removed for repair, renewal, or for any other purpose.

Figure 15:
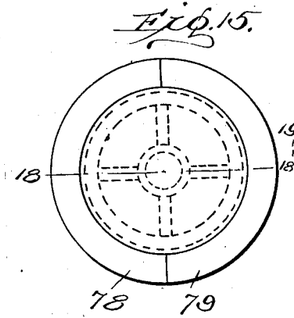
Fig. 15 is a side elevation of a slightly modified form of friction band, a brake wheel being shown in dotted lines in connection therewith.
Figure 16:
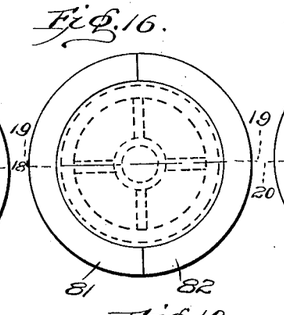
Fig. 16 is another modified form of friction rim having shown in connection therewith in dotted lines a brake wheel.
Figure 17:
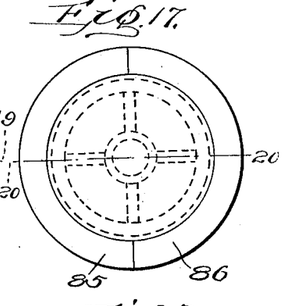
Fig. 17 is a still further modified form of friction rim, a brake wheel being shown in dotted lines in connection therewith.
Figure 18:
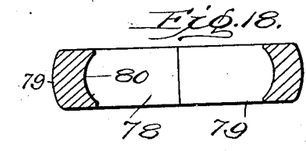
Fig. 18 is a section through Fig. 15 on line 18—18.
Figures 19, 20:
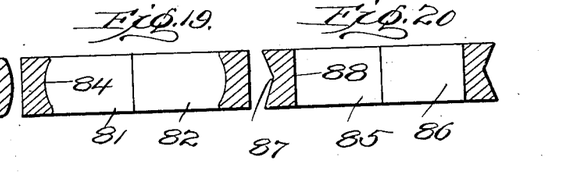
Fig. 19 is a section through Fig. 16 on line 19—19.
Fig. 20 is a section through Fig. 17 on line 20—20.

Referring to Figs. 15 to 20 inclusive, there will be seen several forms of brake wheel friction rims. In Figs. 15 and 18 a brake rim formed of parts as 78 and 79 are arranged with a curved periphery 79' and an inner curved surface 80. The curved surface 80 is adapted to fit the brake wheel and to be secured thereto by any desired means, as, for instance, bolts. The periphery 79' is curved and is adapted to receive a curved brake shoe. The curving of the friction rim and the brake shoe presents a shoe that will not easily fail to make contact, and also presents a shoe that has a comparatively large bearing surface. Fig. 16 shows a friction rim formed in a plurality of parts as 81 and 82. The members 81 and 82 are formed with a flat outer surface 83 and a curved inner surface 84, the inner surface being adapted to fit a brake wheel, and the outer surface being presented to the brake shoe. Fig. 17 shows a still further modified form of friction rim formed in a plurality of parts 85 and 86. The parts 85 and 86 are formed with a V shaped groove 87 in the periphery and a flat surface 88 interiorly, the surface 88 contacting with the brake wheel and the outer surface or groove 87 being presented to the brake shoe which is formed with a corresponding ridge for fitting into the groove portion 87.

Among the main features of the invention is the way in which the tumbling or rocking cross center bar acts. This bar acts as an equalizing bar and conveys a pull from one brake wheel to the other, and by reason of the chain makes a direct pull from the lever of the equalizing bar to the brake shoe. When one of the pull rods is operated a direct pull is given to the brake shoe on that side directly by the lever rod, and the brake shoe on the opposite side of the truck will be given a direct pull by the chain secured to the rocker bar or equalizing bar, the chain on the side of the pull rod being operated being slack. When the opposite pull rod is operated the opposite conditions prevail as will be evident. It will also be noted that the brake is applied from either end of the truck and the upright pull lever is thrown back against the stop or stopping block on the opposite end.

Having thus fully described our invention, what we claim as new, and desire to secure by Letters Patent is:—

1. In a brake mechanism for vehicles, a plurality of brake wheels secured to the wheels of the vehicles, a brake shoe for each of said brake wheels, suspending means for supporting said brake shoes, rods bifurcated at their ends for giving a direct pull upon said brake shoes and on each side thereof; the bifurcated portions being positioned astride said brake wheel, and an equalizing bar mounted to rock axially for acting on said rods.

2. The combination with a vehicle having a plurality of axles and traction wheels, of a brake mechanism comprising independent brake wheels secured to said axles, a brake shoe adapted to engage each of said brake wheels, a rod connected with each of said brake wheels, a rod connected with each of said brake shoes, an equalizing bar, means for connecting said rod to said equalizing bar, and means for rocking said equalizing bar axially.

3. The combination with a vehicle having a plurality of axles, a brake wheel for each of said axles, a brake shoe for each of said brake wheels, a rod connected with each of said brake shoes, an equalizing bar mounted to rock axially, a chain connecting each of said rods with said equalizing bar, and a plurality of operating levers connected with said rods for operating the same and said equalizing bars.

4. In a brake mechanism for vehicles, the brake wheel formed with a removable rim, bolts countersunk in said rim for securing said rim to said wheel, means for spacing said rim from said wheel for preventing heat to be communicated from said rim to said wheel, a brake shoe adapted to engage said rim, and means for operating said brake shoe.

5. In a brake mechanism for vehicles, a brake wheel formed with a body portion, a movable friction rim, means countersunk in said movable friction rim for securing said rim to said wheel, means projecting from said rim and engaging said wheel for spacing said rim from said wheel, a brake shoe adapted to engage said brake wheel, and means for operating said brake shoe.

6. A brake mechanism for vehicles comprising a brake wheel formed with a body portion, a friction rim divided into a plurality of parts, each part being formed with lugs projecting therefrom for spacing the rim from the body portion of the brake wheel, removable means for removably securing said rim to said body portion, a brake shoe adapted to engage said rim, and means for operating said brake shoe.

7. In a brake mechanism for vehicles, a brake wheel formed with a removable rim, means for rigidly securing said rim to said wheel, said rim being formed with a plurality of projections for spacing the body portion of said rim from said wheel, a brake shoe adapted to engage said brake wheel, and means for operating said brake shoe.

8. A brake mechanism for vehicles comprising a brake wheel formed with a body portion, a removable rim provided with a plurality of parts, means for securing said rim to said body portion, said rim being grooved centrally around its periphery, a brake shoe adapted to contact with said rim, said brake shoe being formed with a ridge projecting from the face of said brake shoe and registering with the groove on said rim, means for pivotally supporting said brake shoe, and means for applying said brake shoe to said brake wheel.

9. In a brake mechanism for vehicles, brake wheels, a brake shoe for each of said brake wheels, an equalizing bar for connecting said brake shoes, rocking lever, levers for operating said brake shoes, links connecting said levers and said equalizing bar, means for operating said levers, and a stop for each of said levers for limiting the movement of the same.

10. In a brake mechanism for vehicles, brake wheels, a brake shoe for each of said brake wheels, a rod connected with each of said brake shoes, a lever connected with each of said rods for operating the same, an equalizing bar, links connecting said levers and said equalizing bar, operating means connected with said levers, stops for limiting movement of said levers, and guiding means for guiding the movement of said levers.

11. In a brake mechanism for vehicles, brake shoes, brake wheels each engageable by one of the brake shoes, an equalizer bar, a pair of rocking levers, links connecting each of the levers with the equalizer bar, connections between each of the levers and the respective brake shoes, an operating means connected with each of the levers, an arm carried by the equalizer bar, and loose connection between each of the levers and the arm.

In testimony whereof we affix our signatures in presence of two witnesses.

THOMAS J. MULLEN.
THOMAS F. BRENNAN.
MICHAEL J. BRENNAN.

Witnesses:
J. H. SEARLE,
PATRICK REILLY.